United States Patent [19]

Boys

[11] Patent Number: 5,060,536
[45] Date of Patent: Oct. 29, 1991

[54] FLEXIBLE CRANK DRIVE

[76] Inventor: Donald R. Boys, 2720 Tierra Way, Watsonville, Calif. 95076

[21] Appl. No.: 488,235

[22] Filed: Mar. 5, 1990

[51] Int. Cl.$^5$ .............................................. G05G 1/14
[52] U.S. Cl. ...................................... 74/594.1; 74/581; 74/594.3
[58] Field of Search ................. 74/594.1, 594.2, 574.3, 74/581, 599

[56] References Cited

U.S. PATENT DOCUMENTS

| 518,456 | 4/1894 | Ide ........................................ 74/594.1 |
| 584,809 | 6/1899 | Anthony . |
| 620,164 | 2/1899 | Mumford et al. .................. 74/594.3 |
| 621,883 | 3/1899 | Whitney et al. ..................... 74/594.3 |
| 1,323,004 | 11/1919 | Boyd .................................. 74/594.3 |
| 2,316,530 | 4/1943 | Nilsen ................................ 74/594.3 |
| 3,779,099 | 12/1973 | Trammell ....................... 280/256 X |
| 4,009,623 | 3/1977 | Smith et al. .................... 74/594.1 X |
| 4,583,422 | 4/1986 | Boyd ................................. 74/594.2 |
| 4,898,047 | 2/1990 | Cropek .......................... 74/594.1 X |

FOREIGN PATENT DOCUMENTS

| 9527 | of 1928 | Australia ........................... 74/594.3 |
| 565863 | 4/1958 | Belgium ............................ 74/594.3 |
| 634612 | 2/1928 | France ............................... 74/594.3 |
| 729781 | 7/1932 | France ............................... 74/594.3 |
| 889597 | 1/1944 | France ............................... 74/594.3 |
| 978498 | 1/1944 | France ............................... 74/594.3 |
| 2409183 | 11/1977 | France ............................... 74/594.3 |
| 366722 | 1/1939 | Italy .................................. 74/594.3 |
| 450597 | 7/1948 | Italy ................................ 745/594.3 |
| 599986 | 11/1959 | Italy .................................. 74/594.3 |
| 33020 | 5/1934 | Netherlands ..................... 74/594.3 |
| 80229 | 5/1952 | Norway ............................ 74/594.1 |
| 237306 | 8/1945 | Switzerland ..................... 74/594.3 |
| 15035 | of 1894 | United Kingdom ............. 74/594.3 |
| 22829 | of 1896 | United Kingdom ............. 74/594.3 |
| 10754 | of 1897 | United Kingdom ............. 74/594.3 |
| 17686 | of 1897 | United Kingdom ............. 74/594.1 |
| 26636 | of 1897 | United Kingdom ............. 74/594.3 |
| 6632 | of 1898 | United Kingdom ............. 74/594.3 |
| 19031 | of 1899 | United Kingdom ............. 74/594.2 |
| 285253 | 2/1928 | United Kingdom ............. 74/594.3 |
| 631997 | 11/1949 | United Kingdom ............. 74/594.3 |

Primary Examiner—Rodney M. Lindsey

[57] ABSTRACT

A bicycle crank has flexible crank arms designed to deflect elastically under the influence of force on the pedals, allowing the point of application of force to advance relative to the rotational position of the sprocket device. In a preferred embodiment the crank arms are made of glass fiber-reinforced epoxy, and have a generally rectangular cross section.

8 Claims, 9 Drawing Sheets

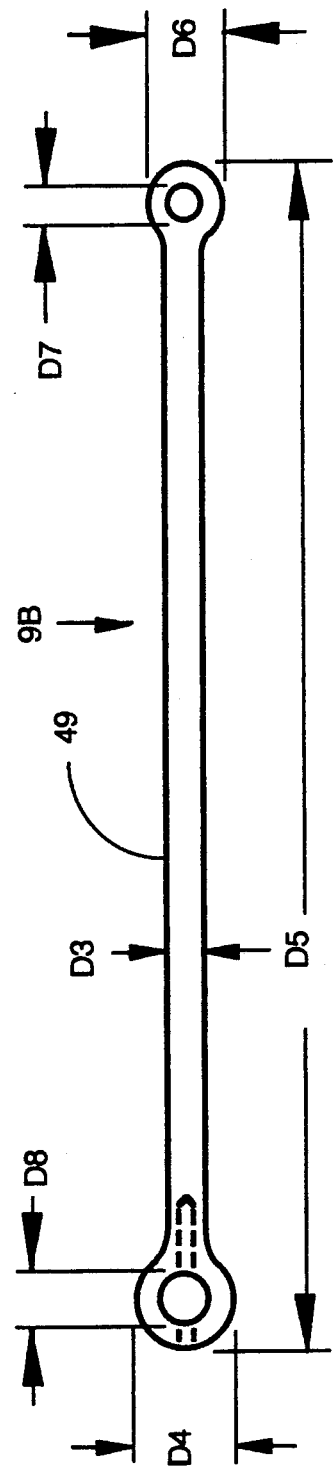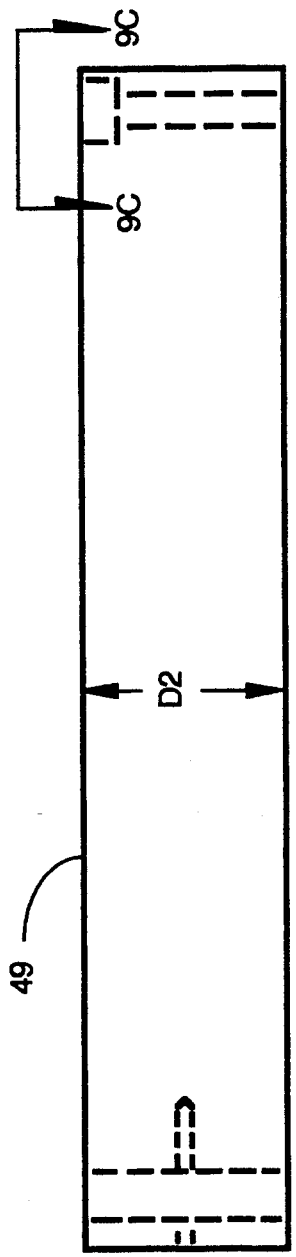
Fig. 8
Fig. 9A
Fig. 9B
Fig. 9C

FLEXIBLE CRANK DRIVE

FIELD OF THE INVENTION

This invention is in the field of crank and pedal combinations for manually powering vehicles and machinery, and relates in a preferred embodiment to such a combination for powering a bicycle.

BACKGROUND OF THE INVENTION

FIG. 1 is a side elevation view of a crank, pedal and chain-sprocket drive in a conventional arrangement as typically used for manually powering a bicycle. FIG. 2 is a partial section elevation view of the assembly of FIG. 1 taken generally along the section line 2—2 of FIG. 1, and in the direction of the arrows.

Chain-sprocket 11 has a working diameter D1, and is typically configured for No. 41 roller chain, although other sizes have been and are used for bicycle propulsion. Diameter D1 is typically about 20 mm., although sprockets of widely varying diameters are used. Crank 13 has a horizontal portion 29 that extends through a frame 25, and is engaged in the frame by means of ball bearings 27 and 35. Details of machining of races and shoulders on both crank portion 29 and the inside of the bore through frame 25 to effect the mounting of the ball bearings are not shown.

The crank has a flanged portion 21 near one end of horizontal portion 29, and sprocket 11 is fixedly attached to flange 21 by means of fasteners such as fastener 15. The plane of flange 21, and hence the plane of sprocket 11, are at right angles to portion 29 of crank 13.

Crank 13 has two arms 14 and 16 of equal length L at right angles to portion 29 and extending in opposite directions. Length L is typically about 25 mm., although lengths vary widely. Arm 14 ends in a pivot mounting 19 to which a pedal assembly 17 is rotationally attached, and arm 16 ends in a similar pivot mounting 20 to which a pedal assembly 31 is rotationally attached. The crank arm on the sprocket side has a projection 33 which extends through an opening in sprocket 11 and helps to transfer torque from the crank to the sprocket in use, so that all the torque is not transmitted through the screw fasteners, such as fastener 15, that attach the sprocket to the crank.

In some crank and sprocket arrangements the projection to the sprocket fastens to the sprocket by conventional fasteners, and in some no such projection is used. Also, the sprocket and crank may be a single unit formed from a machined casting, or by other means. In many arrangements there is a single sprocket, and in many arrangements there are multiple sprockets of different diameters mounted side by side with a deraileur mechanism operable by the rider of the bicycle to move the drive chain from one sprocket to another to change the mechanical advantage of the drive train.

The arrangement of the crank, pedals and sprocket is such, as is best illustrated by FIG. 1, that the rider of the bicycle may exert force in a generally downward direction on the pedal at the end of one extension of the crank, and that force, represented by arrow F1 in FIG. 1, will be translated to a varying torque on chain-sprocket 11 as the crank rotates and the bicycle is propelled forward. The torque exerted on sprocket 11 by the crank is converted to a force in an endless chain (not shown) which becomes a torque in a rear sprocket (also not shown) which drives a rear wheel of the bicycle.

Rotation of crank 13 is shown in FIG. 1 beginning arbitrarily as zero rotation with the crank arm on the sprocket side extending vertically upward. Rotation proceeds, also arbitrarily, in the direction of arrow 23, and the amount of rotation is shown in radians for each one-quarter of a revolution through a first full revolution. The crank arm on the sprocket side is shown in FIG. 1 at an angle theta from the vertical, and theta is meant to represent any rotation from 0 to one-half revolution. When the sprocket-side crank arm has revolved through one-half revolution, and points vertically downward, the opposite side crank arm (ending in pedal 31) will point vertically upward, and the bicycle rider then typically shifts his force to this opposite pedal for the next one-half revolution.

It is quite true that a rider may exert more or less force on a pedal, and the force may not necessarily be directed precisely vertically downward. It is also true that the force exerted over a half-revolution will vary both in direction and amplitude, and there may be many force patterns exerted by a rider. For purposes of calculation and comparison, however, it is convenient to consider the force exerted by the rider as a constant force exerted vertically downward.

To understand the operation of the conventional pedal and crank arrangement of the prior art, it is convenient to apply engineering and mathamatical concepts of force, work and power. Force F1 is exerted on pedal 17 in FIG. 1, and force is transferred to the crank at rotational connection 19. The force on the crank arm may be resolved by the methods of vectorial combination into two forces, one in a direction along the axis of the crank arm and the other at right angles to the crank arm. At theta=0, with the crank arm vertically upward, force F1, which is shown vertically downward, will have no component at right angles to the crank, and the entire force will be along the crank axis toward the frame. This condition is shown by FIG. 3A. As the crank rotates, theta becomes greater than zero, and FIG. 3B shows a force vector diagram for an approximate angular rotation of 30 degrees. At this position of angular rotation, force F1 has a component F2 at right angles to crank 13, and a component F3 along the axis of the crank arm toward the frame. Force F3, passing through the center of rotation of the crank, provides no rotational torque to the crank and sprocket assembly. It may be shown that the instant force F3, at the position shown, has no propulsive effect on the bicycle, even though force F3 may have a component in the direction of movement of the bicycle (or in the opposite direction). This is so, because for the rider to exert this force on the frame, an equal and opposite force must be exerted elsewhere on the frame, or the rider would else not move along with the bicycle. The instant force F2, at right angles to the crank arm, is actually exerted at the rotational attachement point 19, and provides a rotational couple to the crank equal in magnitude to $F2 \times L$.

As rotation continues, F1 remaining constant in magnitude and downward direction, F2 perpendicular to the crank arm increases in magnitude and F3 along the crank arm axis toward the frame decreases in magnitude, until, at 90 degrees rotation (theta=Pi/2), F3 becomes zero, and F2 becomes F1, as is shown in FIG. 3C. At this point in rotation the torque applied to the crank and sprocket assembly is maximum at $F1 \times L$.

When rotation of the crank is beyond the 90 degree point, component F2 perpendicular to the crank arm begins to decrease from the maximum magnitude, and F3 reappears, but in the direction along the crank arm axis away from the frame. The situation at theta=3 Pi/4 (135 degrees) is shown in FIG. 3D. Force F2, which is in reality applied at rotational point 19, provides an instantaneous torque equal to F2×L, and the force F3, which passes through the axis of rotation of the crank and sprocket assembly, provides, as before, no propulsive effect. At theta=Pi (180 degrees), which is one-half revolution of the crank and sprocket assembly, shown in FIG. 3E, the entire force F1 is along the axis of the crank, away from the frame, and there is no component at right angles to the crank arm. There is therefore no propulsive torque applied at this point in revolution.

At the point shown in FIG. 3E, one-half revolution, the opposite side crank arm is vertically upward, and the rider shifts his application of force to that side. The force components and torque effects for the second half revolution follow exactly the diagrams presented as FIGS. 3A through 3E.

Mathamatically, the general case can be expressed from FIG. 3B, with theta representing any angle of rotation from 0 degrees through (and including) 180 degrees (one-half revolution). Of primary interest is the varying magnitude of F2, which determines the magnitude of torque applied to the crank arrangement. The vector right triangle formed by the force vectors has F1 as hypotenuse, and angle theta is the angle between F1 and F3. By definition of the Sine function in trigonometry, F2=F1 Sin(theta). As theta increases from zero, Sin(theta) increases from zero to a maximum value 1 at theta=90 degrees (Pi/2 radians). So at 90 degrees F2=F1, and F3 disappears.

The case for the second quarter revolution from theta=90 degrees to theta=180 degrees can be expressed from FIG. 3D, for which theta is between these two values. In FIG. 3D theta is greater than 90 degrees, and is therefore larger than any of the internal angles of the vector right triangle of F1, F2 and F3. Considering the vector right triangle, again by the definition of the Sine function in trigonometry, the force F2 perpendicular to the crank arm can be expressed as a function of the applied force F1, as F2=F1 Sin (alpha). The angle alpha is the angle between the vectors F1 and F3. By the methods of formal trigonometry, alpha=180 degrees−theta, and Sin(180 degrees−theta) is always equal to Sin(theta). Therefore, for rotation between 90 degrees and 180 degrees, F2=F1 Sin(theta), just as was true for rotation between zero and 90 degrees. The relationship F2=F1 Sin(theta) therefore holds for all points of rotation between zero and 180 degrees, and the torque applied to the sprocket for all such points of rotation of one arm of the crank is T=F1×L×Sin(-theta).

Since the force and torque analysis for the opposite crank arm to which force F1 is shifted as theta reaches 180 degrees is identical to the analysis just done for the first crank arm, the torque applied for the second half revolution of the crank follows the same relationship as for the first half revolution. The Sine function is a harmonic function related to revolution. A plot of the torque producing force F2, or of torque (since L is constant) applied to the sprocket by application of a constant force F1 downward on the pedal of one crank arm during rotation of that crank arm between zero and 180 degrees, then transferring that force to the opposite crank arm for its rotation between zero and 180 degrees, the two half revolutions making one complete revolution of the sprocket, is approximately as shown by FIG. 4. Torque or Force F2 is the ordinate (vertical axis), and revolutions of the sprocket is the abscissa (horizontal axis). For each half revolution of the sprocket the torque or force describes the positive half of a full revolution Sine function. The function reaches zero for each half revolution, but never goes negative (as does a true Sine function) because the driving force F1 is shifted each half revolution to the opposite pedal, keeping the torque positive.

The graph of FIG. 4 showing the force and torque variations for the idealized case as a function of sprocket revolution can also be used to illustrate the work done by a rider in propelling the bicycle. It may be shown mathamatically that for this idealized case the work (W) done by a rider is W=F1×L for one half revolution of the sprocket. It follows that for the idealized case, the work for a full revolution of the sprocket is 2×F1×L; and, if N is the number of sprocket revolutions, the total work done through multiple revolutions will be:

$$W_T = 2 \times N \times F1 \times L$$

As a rational example, if a rider provides a downward constant force of 20 pounds (9.072 Kg.) on the pedals, the crank length is 9 inches (0.75 ft., 22.86 cm.), and the rider travels a distance requiring 1000 revolutions of the sprocket, the work done will be:

$$W = 2 \times 1000 \times 20 \times 0.75 = 30,000 \text{ Ft-Lbs.}$$

or $$W = 4150 \text{ Kg} - M = 40,680 \text{ Joules}$$

Power is the rate of doing work. If the rate in the example is one revolution of the crank per second, then 1000 revolutions are accomplished in 1000 seconds with 30,000 Ft-Lbs of work performed. The power is 30 Ft-Lbs/sec., which is 0.055 Horsepower.

For the purpose of this specification a power stroke is defined as the application of a downward force by a rider on a pedal at the end of one crank arm over the time for the crank arm to revolve from a vertical up position to a vertical down position. The variations in moment force F2 and torque over that period, assuming the force applied is vertically downward and constant over the period, are shown in the part of the graph of FIG. 4 from 0 revolutions of the crank to ½ revolution. The relative work done over that period is represented by shaded area 39 under the curve, and is equal to F1×L. It may also be shown that if all the applied force (F1) over a power stroke were convertible to useful work, the work would be F1×Pi×L, and Pi×L in this expression is equal to the arc length described by the outer end of a crank arm at distance L from the rotational center in the frame, over the ½ revolution of the power stroke. The ratio of the theoretical maximum work to the actual is the mathamatical constant Pi, which is approximately 3.14159. The actual is 1/Pi, or about 31.8% of the theoretical maximum work. The concept of the power stroke is convenient, because it repeats for each ½ revolution of the crank and sprocket, and the total work over any period can be related to the number of power strokes.

The most obvious difficulty with the conventional crank and sprocket arrangement is the fact that not all of the force applied by a rider is convertible to useful work. As is evident by the force analysis presented above, including the graph of FIG. 4, the force doing work is only equal to the force applied to the pedals by a rider at one instant in the power stroke, when the crank arm is horizontal as shown in FIG. 3C, and F2=F1. At all other times F2 is less than F1. As a result, much effort may be wasted by a rider, particularly near the beginning and end of a power stroke, when most of the force applied by the rider is absorbed by the frame, and only a small portion goes into producing torque to propel the bicycle. Clearly what is needed is a mechanism to make more use of the forces a rider may apply to propel the bicycle.

SUMMARY OF THE INVENTION

In a preferred embodiment a crank for driving a sprocket for propelling a bicycle is provided having a crankshaft for mounting in bearings in the frame of the bicycle and a flexible crank arm mounted to the crankshaft. The crank arm is designed to deflect elastically as a leaf spring in the direction of rotation of the crank under the influence of a force applied to the crank arm at the end away from the crankshaft. The crank arm in the preferred embodiment is made of glass fiber-reinforced epoxy material, and has a substantially rectangular cross section with a width preferably equal to or greater than four times the width. The ability to deflect elastically in the direction of rotation allows a pedal assembly mounted to the crank arm to rotate ahead of the sprocket under the influence of an applied force, allowing more of an applied force at any point in a power stroke to be converted to a useful torque for propelling the bicycle. Moreover, work done by a rider to deflect the crank arm during the early part of a power stroke is stored as potential energy and returned to the system as the applied force is removed near the end of a power stroke.

BRIEF DESCRIPTION OF THE DRAWINGS

FIG. 8 is cross section through the crank arm of FIG. 5 taken along the line 8—8 of FIG. 5.

FIG. 9A is a side view a crank arm of the assembly of FIG. 5 showing additional detail and dimensions.

FIG. 9B is a view of the crank arm of FIG. 9A in the direction of arrow 9B of FIG. 9A.

FIG. 9C is a view of one end of the crank arm of FIG. 9B in the direction of the line 9C—9C of FIG. 9B.

DESCRIPTION OF THE PREFERRED EMBODIMENTS

Figure 5:
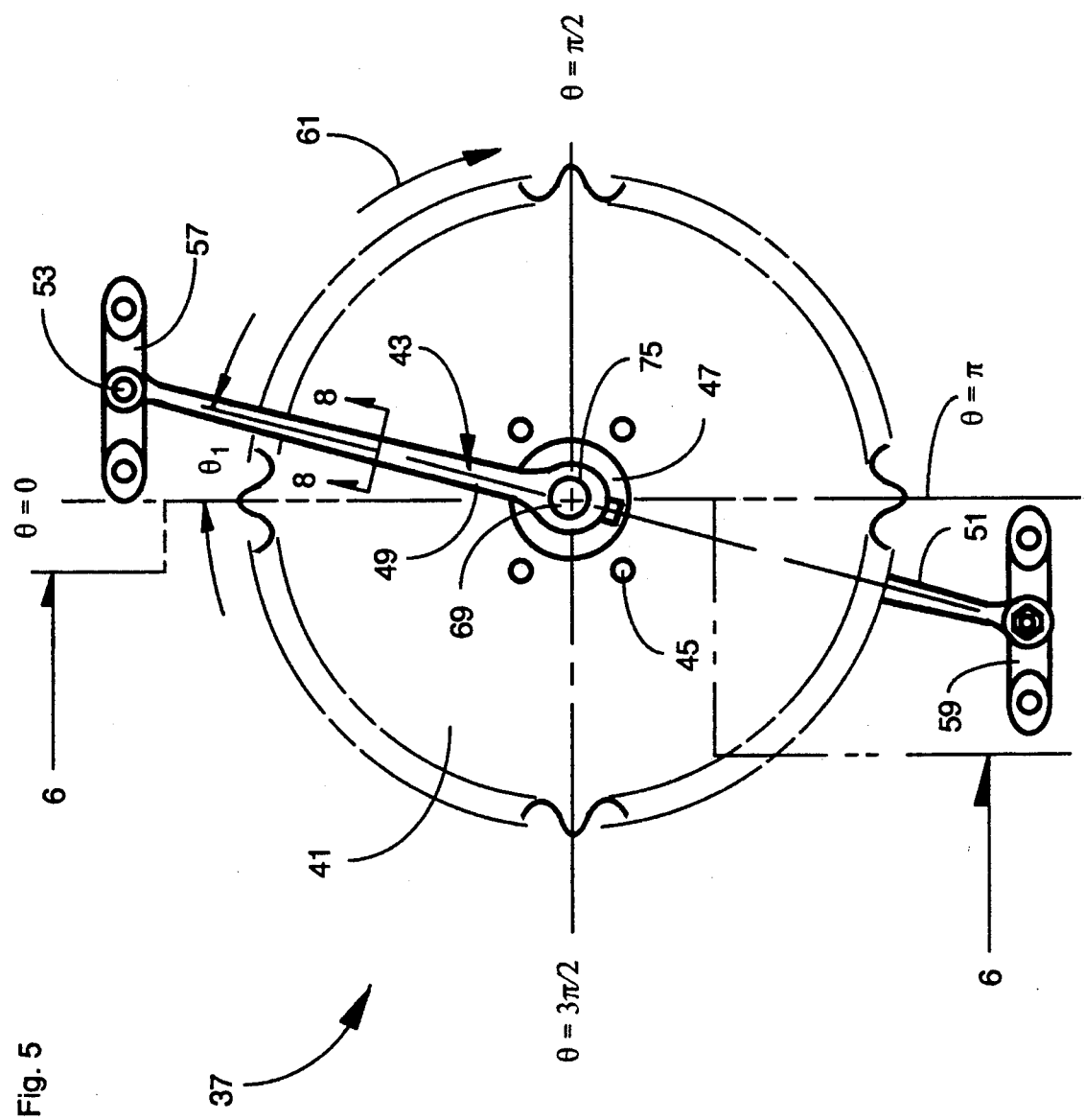
FIG. 5 is a side elevation view of a crank and sprocket assembly according to a preferred embodiment of the invention.
Figure 6:
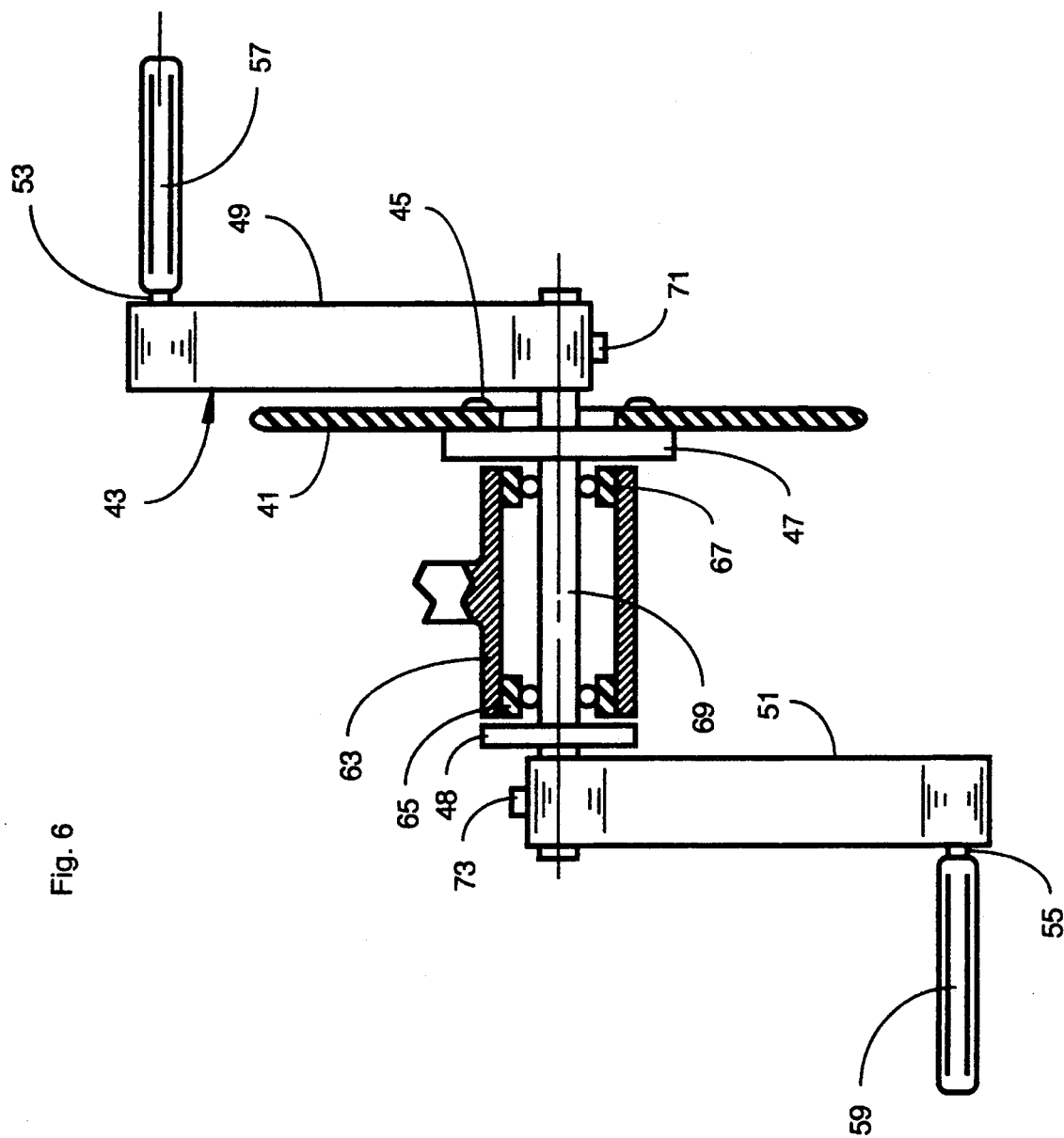
FIG. 6 is a partial section elevation of the crank and sprocket assembly of FIG. 5, taken generally along the line 6—6 of FIG. 5.

FIG. 5 is a side elevation view of a crank and sprocket apparatus according to a preferred embodiment of the present invention. FIG. 6 is a partial section view of the apparatus of FIG. 5 taken along the section line 6—6 of FIG. 5. A crank shaft 69 (FIG. 6) is mounted through a bicycle frame 63 and rotationally mounted in bearings 65 and 67 in a conventional manner. A flange 47 to one side of the bearings is fixedly attached to the crank shaft and a flange 48 on the opposite side is mounted to the crank shaft to be removable for purposes of assembly, disassembly and service, as is known in the art.

The crank shaft in the preferred embodiment extends beyond flanges 47 and 48 for mounting two crank arms 49 and 51. Crank arm 49 ends in a rotational mounting 53 to which a pedal assembly 57 is mounted, and crank arm 51 ends in a rotational mounting 55 to which a pedal assembly 59 is mounted. The pedals, rotational mountings, crank arms and the crank shaft together make up a crank assembly 43. A conventional sprocket 41 is mounted with fasteners such as fastener 45 to flange 47.

Side elevation FIG. 5 shows the crank and sprocket assembly of the preferred embodiment with pedal assembly 57 rotated by an angle $theta_1$ of about 10 degrees in the rotary direction of arrow 61 from the vertical top position. The direction of arrow 61 will be the direction for forward drive of the bicycle or other vehicle powered by the crank and sprocket drive in this specification. Pedal 57 in FIG. 5 is thus in a position near the beginning of a power stroke, but no downward force is shown exerted on the pedal.

Crank arm 49 has a hole 75 by which the arm mounts to the crankshaft, and the arm is secured to the shaft by a bolt 71 that passes through a hole (not shown) that is threaded through the shaft and extends for about 2 cm. into arm 49. Arm 51 is mounted to the crank shaft in a similar manner by a bolt 73. There are many alternative ways that the arms may be mounted to the crankshaft that are usable, with the requirement being that the fastening be secure enough to transfer torque from the arm to the shaft without premature failure.

Figure 7:
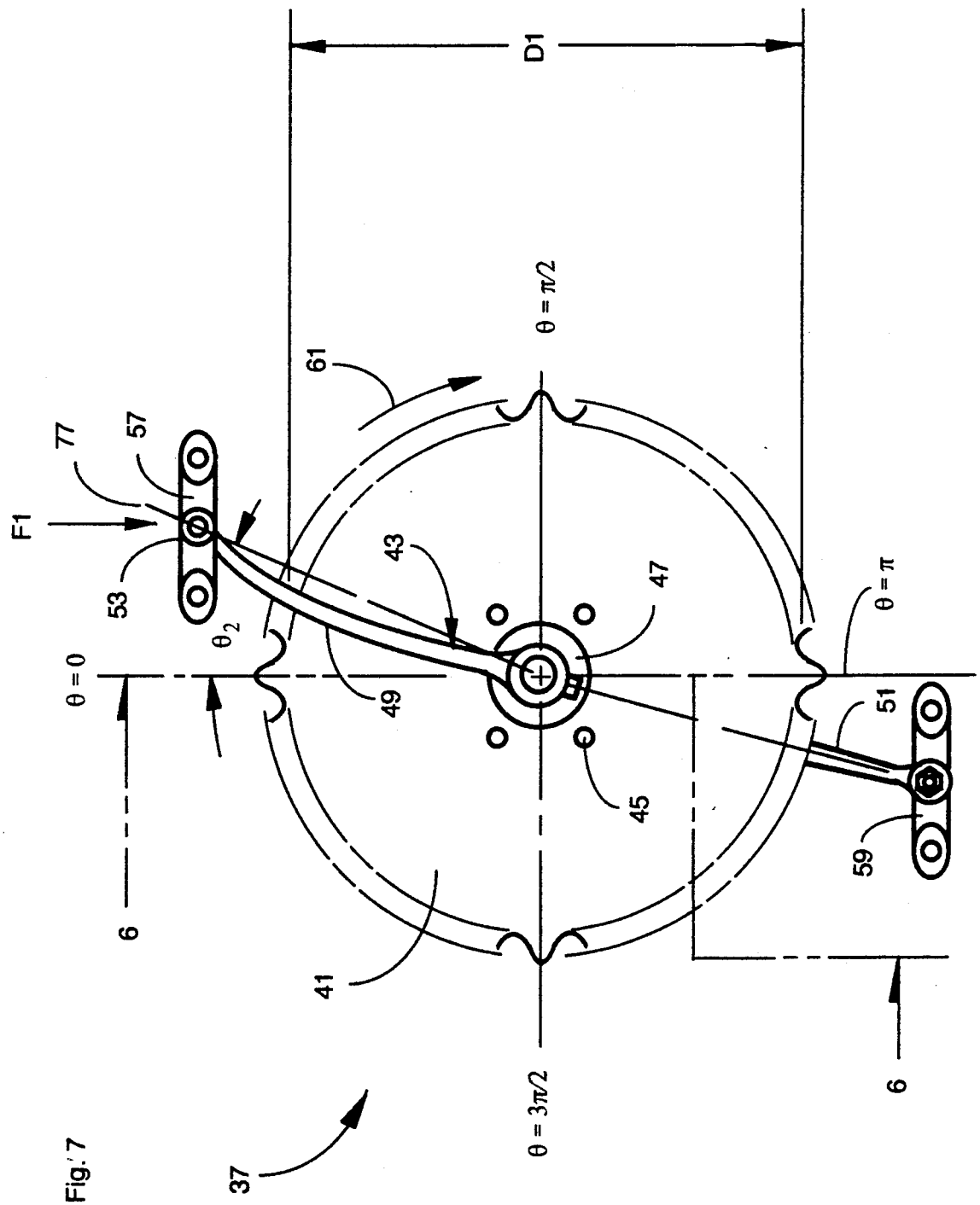
FIG. 7 is a side elevation view of the assembly of FIG. 5 with a downward force applied to a pedal assembly mounted on the crank arm, showing the crank arm in elastic deflection.

Crank arms 49 and 51 differ from conventional crank arms in that each is designed to flex in operation as force is applied to the pedals. FIG. 7 is a side elevation view similar to FIG. 5, except in FIG. 7 a force F1 is shown applied to pedal assembly 57. Sprocket 41 is in the same rotated position in FIG. 7 as in FIG. 5, but pedal assembly 57 has moved. Force F1 has caused crank arm 49 to flex to a curved shape so that line 77 from the sprocket center to the center of the rotational mounting at pedal assembly 57 is now at an angle $theta_2$ of about 20 degrees ahead of the vertical top position.

Figure 1:
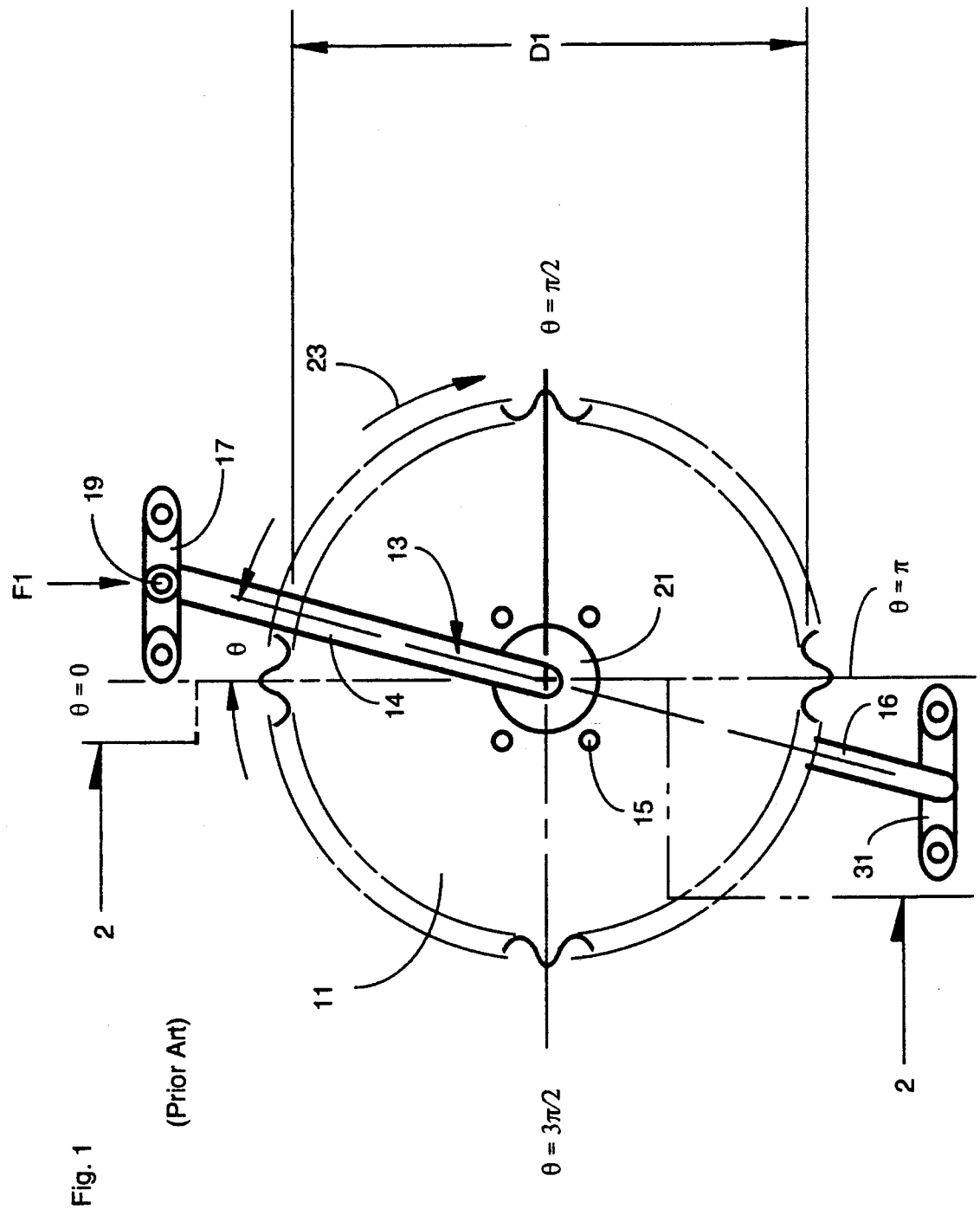
FIG. 1 is a side elevation of a prior art crank and sprocket arrangement.
Figure 2:
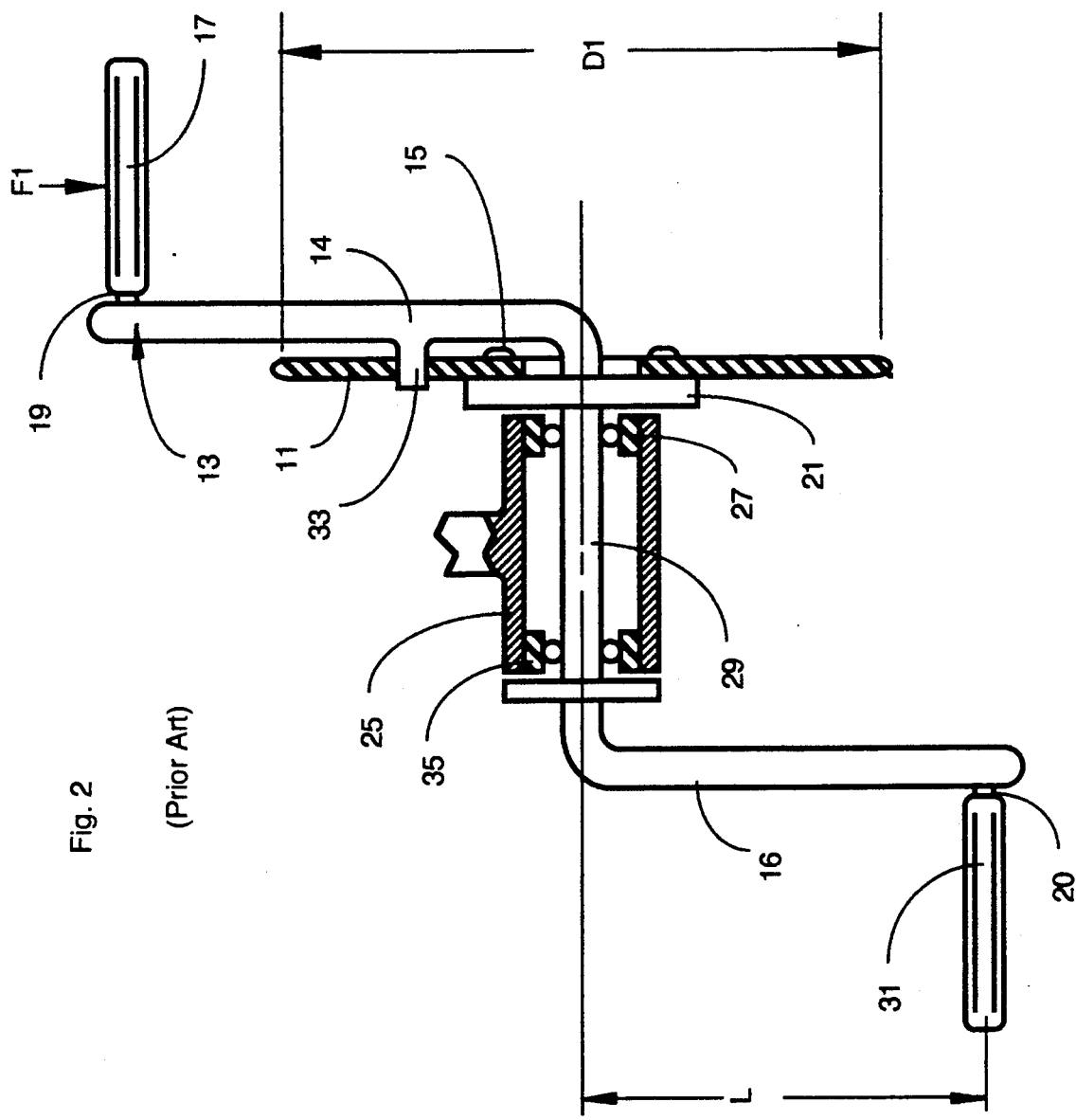
FIG. 2 is a cutaway view showing the mounting of a prior art crank and sprocket assembly to a frame.
Figure 3A:
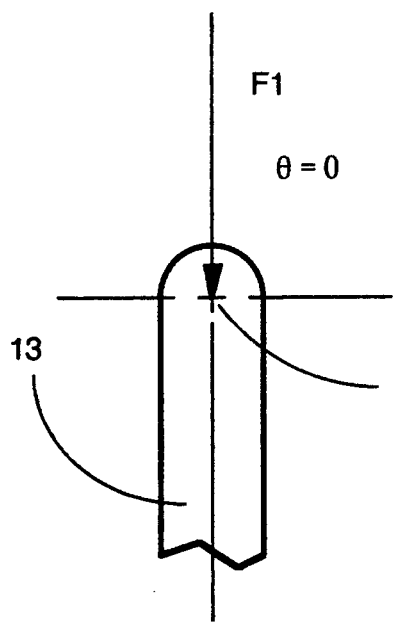
FIG. 3A is a partial view of a prior art crank in a vertical position with a force applied.
Figure 3B:
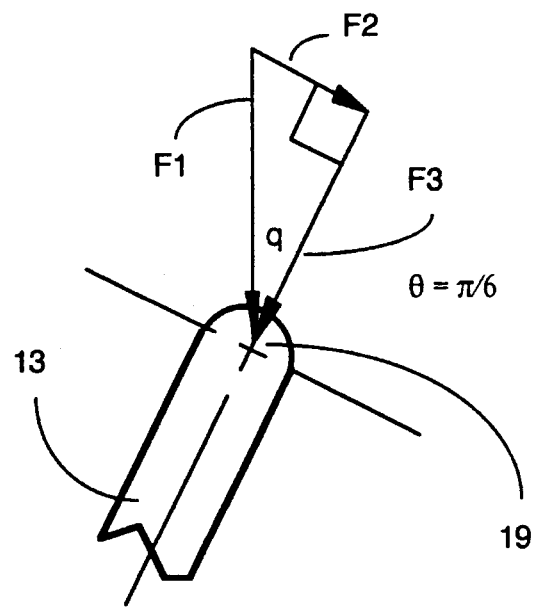
FIG. 3B shows a prior art crank partially rotated and the vector summation of forces on the crank.
Figure 3C:
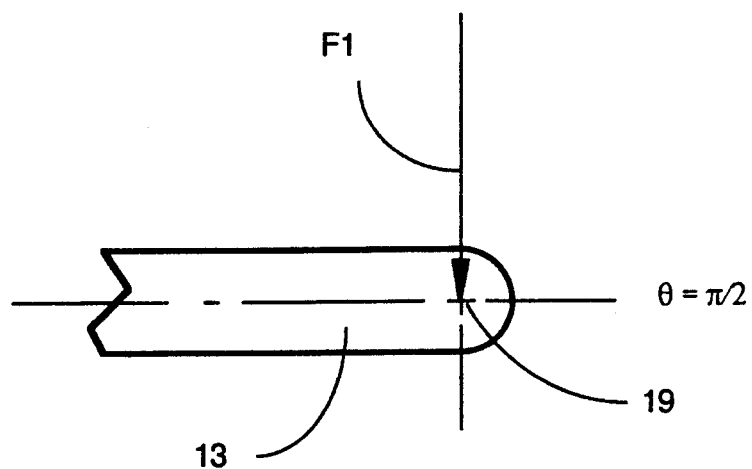
FIG. 3C shows the crank of FIG. 3A and FIG. 3B rotated to a position of 90 degrees from the vertical.
Figure 3D:
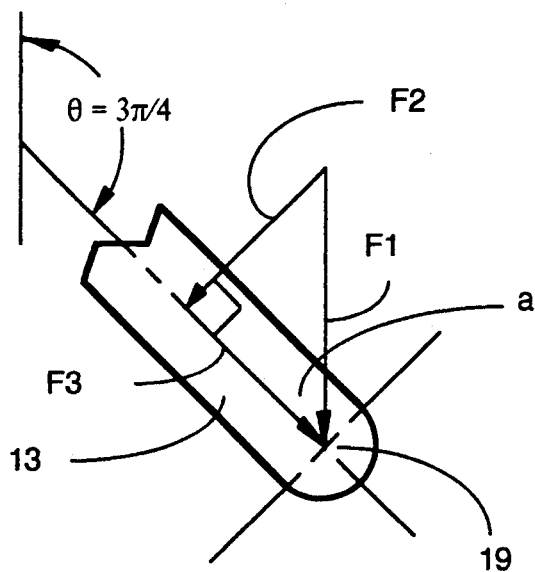
FIG. 3D shows the prior art crank rotated 135 degrees from the vertical.
Figure 3E:
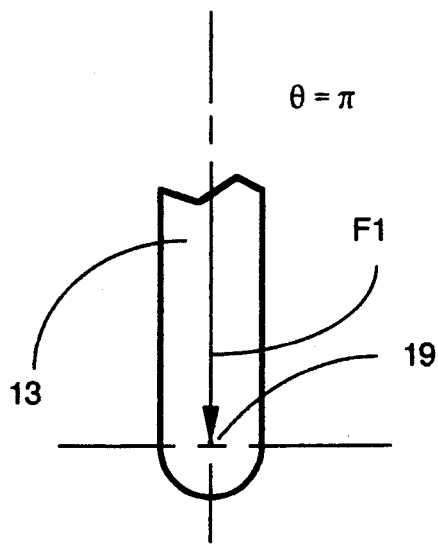
FIG. 3E shows the prior art crank rotated 180 degrees from the vertical.
Figure 4:
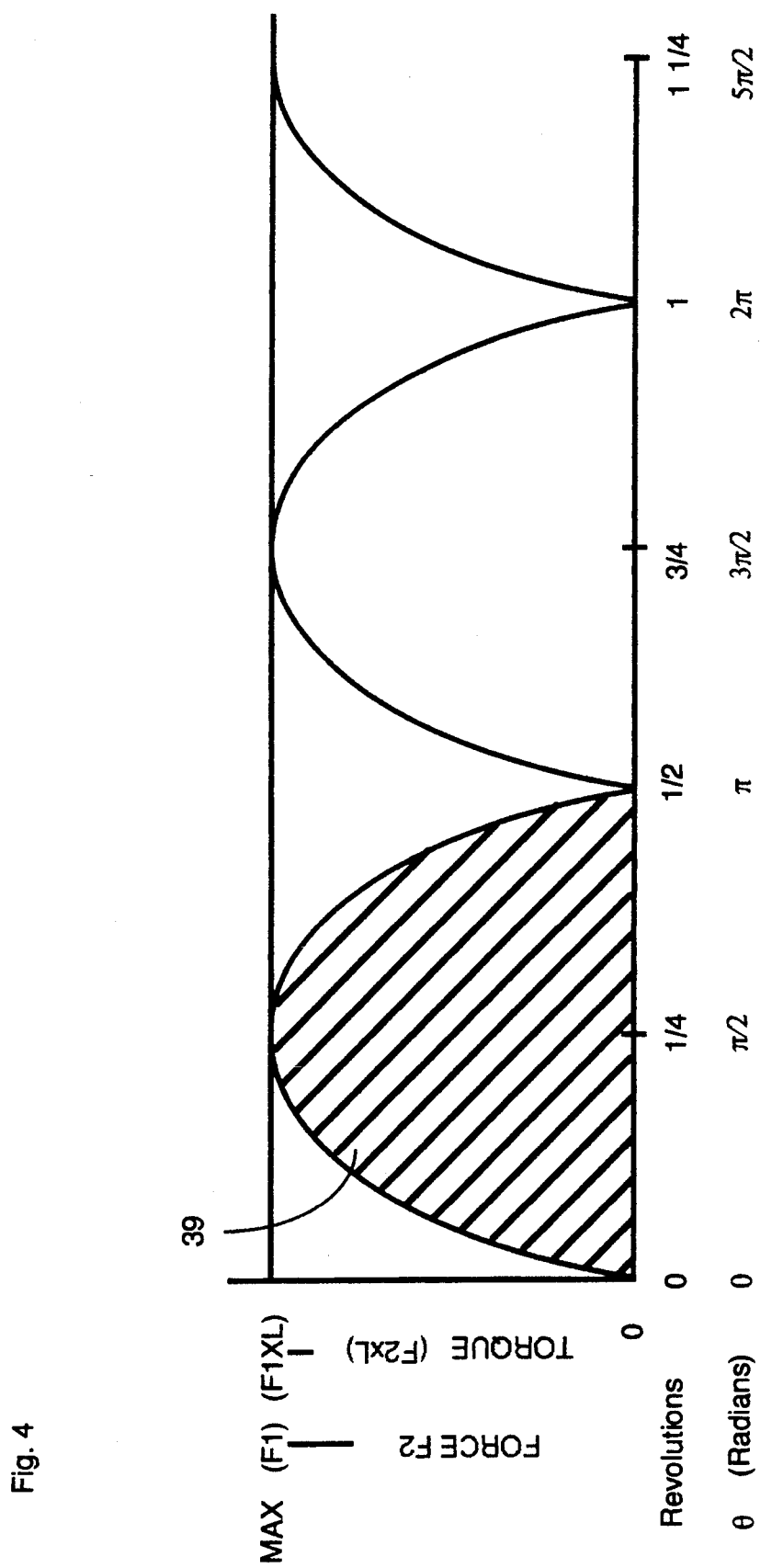
FIG. 4 is a graphical representation of the forces, torque and work relative to a crank and sprocket of the prior art.

Referring back to the force analysis described with the aid of FIG. 3B, it is clear that with force F1 unchanged, force F2, which determines the magnitude of the torque applied to the crank, hence to the sprocket, will be larger for the position of the crank and sprocket shown in FIG. 7 than for the position shown in FIG. 5. The position shown in FIG. 5 is the position that would result from a crank arm that did not flex.

It is true that the effective length of the crank arm is shorter for the deflected case than for the undeflected case, and the shorter effective crank arm in the deflected case tends to reduce the applied torque. The increase in the effective force at right angles to the crank arm, however, more than overcomes the effect of the shorter effective crank arm. Consider the illustrated case in which the rotational angle increases from 10 degrees to 20 degrees from the vertical. The Sin of 10 degrees is about 0.17365, while the Sin of 20 degrees is about 0.34202, 1.96 times greater. To overcome this advantage, the effective crank arm would have to be reduced to one-half the original undeflected length.

In operating a bicycle a rider does not apply an even and unchanging force F1 to the pedals. Normally the force is larger near the beginning of the power stroke, and the rider lessens the force near the end of the power stroke as he or she prepares to shift weight to the opposite pedal assembly as it approaches the vertical up position. The flexible crank arms of the present invention allow the rotational position of the pedal assembly to advance relative to the sprocket during the early part of the power stroke, increasing the F2 force and hence the torque for an equal F1, and work done by the rider in flexing a crank arm is stored in the flexed arm as potential energy, as in any other spring. Toward the end of the power stroke, with F1 decreasing, the amount of flex of the crank arm is also decreased, and the stored energy is returned to the system as torque. The inventor believes that the flexible crank arms of the invention allow more of the energy that a rider expends to be utilized to propel the bicycle than is the case with rigid crank arms that do not flex.

FIG. 8 is a cross section of crank arm 49 taken along section line 8—8 of FIG. 5. Dimension D2 is about 5 cm. and dimension D3 is about 0.62 cm., a ratio D2:D3 of about 8:1. To flex properly in the rotary direction while at the same time resisting twisting along the length of the crank arm, the ratio of the width to the thickness, D2 to D3, is preferably equal to or greater than 4:1, and more preferably about 8:1. The exact cross section for best performance is a function of the springiness of the material chosen, the expected weight and strength of a rider, and of the type of performance desired and expected for a bicycle, such as recreational riding or competition. The larger D2 dimension is to reduce the tendency of the crank arm to twist as a result of the fact that the force applied to the pedal is at a short distance from the arm, and induces a twisting moment on the crank arm. The smaller D3 dimension is to allow the arm to readily flex in the forward rotary direction. In the preferred embodiment the cross section is the same along the length except near the ends where the body is enlarged to allow for configuration to mount to the crankshaft and to the rotary mounting for a pedal.

FIG. 9A is a side view of crank arm 49. Crank arm 51 has the same shape. D4 is about 2.5 cm., length D5 is about 20 cm., D6 is about 2 cm., D7 is about 1 cm., and D8 is about 1.6 cm. The dimensions vary in alternative embodiments utilizing different materials and designed for different purposes, such as for an adult rider as opposed to a child. Also, in some embodiments, the cross section is not constant but tapered, being thicker at the end near the crankshaft.

FIG. 9B is a top view of crank arm 49 of the preferred embodiment in the direction of arrow 9B of FIG. 9A. FIG. 9C is a view of the end of crank arm 49 where the pedal attaches, showing a hexagonal recess for a nut to secure the rotational mounting for the pedal assembly.

In the preferred embodiment the crank arms are made of a glass reinforced epoxy material, and the dimensions given are largely a function of the material of manufacture and the relative flexibility of the material, as well as of the intended use of the apparatus. The dimensions given for the preferred embodiment are for an apparatus believed by the inventor to be suitable for a rider of about 150 pounds weight for recreational riding. For small children, for large adults, and for different uses, such as sprint competition or long distance competition, the dimensions and materials will differ.

There are a wide variety of materials that may be used, and other cross sections that would be workable in alternative embodiments. Crank arms can be made of tempered steel, for example, and the arm can be a steel strap of constant cross section, tempered to flex in the forward rotary direction as a leaf spring. Another material that can be used is molded carbon filament material, to produce a light and durable crank arm with a high spring rate.

It will be apparent to those skilled in the art that there are many changes that can be made to the preferred embodiments described above without departing from the spirit and scope of the invention. Several such alterations have already been described, such as tapering the shape of the crank arm to help control the spring rate and the shape of bending under load. Flexible crank arms can be made of many different materials, as well. Tempered steel and carbon filament material have been mentioned, and there are many other materials that exhibit a suitable spring rate and durability. Crank arms can be made longer and shorter as well, and crank assemblies with flexible arms can be used to drive single sprockets as described in the preferred embodiment, or multiple sprockets. There are many other changes that can be made without departing from the spirit and scope of the invention.

What is claimed is:

1. A crank for driving a sprocket for propelling a bicycle comprising:
   a crankshaft mounted rotationally in a frame of said bicycle; and
   a crank arm for applying a torque to turn said crankshaft, said crank arm having a first end mounted to said crankshaft and a second end opposite said first end, said second end for mounting a pedal assembly;
   said crank arm being flexible and deflecting to shorten the distance between said first end and said second end under the influence of a force applied at said second end to turn said crank, said crank arm having a cross-section shape at points at least 2.5 cm. from each end with a long dimension and a short dimension, said short dimension substantially in the direction of rotation of said crank arm to facilitate flexure of said crank arm, and said long dimension substantially at a right angle to said short dimension to impede torsional deflection of said crank arm, said long dimension being at least 4 times said short dimension.

2. A crank as in claim 1 wherein said crank arm is composed substantially of glass fiber-reinforced epoxy material.

3. A crank as in claim 1 wherein said crank arm is composed substantially of a tempered steel alloy material.

4. A crank as in claim 1 wherein said crank arm is composed substantially of carbon filament material.

5. A crank arm for turning a crankshaft for propelling a bicycle comprising:
   a first end having mounting means for mounting to said crankshaft; and
   a second end having connection means for adapting a pedal assembly thereto;
   said crank arm being flexible and deflecting to shorten the distance between said first end and said second end under the influence of a force applied at said second end to turn said crankshaft, said crank arm having a cross-section shape at points at least 2.5 cm. from each end with a long dimension and a short dimension, said short dimension substantially in the direction of rotation of said crank arm to facilitate flexure of said crank arm, and said long dimension substantially at a right angle to said short dimension to impede torsional deflection of said crank arm, said long dimension being at least 4 times said short dimension.

6. A crank arm as in claim 5 wherein said crank arm is composed substantially of glass fiber-reinforced epoxy material.

7. A crank arm as in claim 5 wherein said crank arm is composed substantially of a tempered steel alloy material.

8. A crank as in claim 5 wherein said crank arm is composed substantially of carbon filament material.

* * * * *